United States Patent [19]
Knäbel

[11] Patent Number: 4,926,559
[45] Date of Patent: May 22, 1990

[54] MEASURING DEVICE FOR DETERMINING THE POSITION OF WORKPIECE FACES

[75] Inventor: Horst Knäbel, Meerbusch, Fed. Rep. of Germany

[73] Assignee: Rheinmetall GmbH, Düsseldorf, Fed. Rep. of Germany

[21] Appl. No.: 323,933

[22] Filed: Mar. 15, 1989

[30] Foreign Application Priority Data

Mar. 15, 1988 [DE] Fed. Rep. of Germany ....... 3808548

[51] Int. Cl.$^5$ .............................................. G01B 7/02
[52] U.S. Cl. ........................................ 33/832; 33/556
[58] Field of Search ................. 33/832, 833, 836, 837, 33/556, 557, 558, 558.4, 559, 560, 561

[56] References Cited

U.S. PATENT DOCUMENTS

| | | | |
|---|---|---|---|
| 2,400,440 | 5/1946 | Rudolph | 33/832 |
| 2,533,522 | 12/1950 | Sisson | 33/832 |
| 2,911,726 | 11/1959 | Zelnick | 33/556 |
| 3,785,056 | 1/1974 | Schiler | 33/559 |
| 3,945,124 | 3/1976 | Jacoby et al. | 33/556 |
| 4,409,737 | 10/1983 | Golinelli | 33/561 |
| 4,419,829 | 12/1983 | Miller . | |
| 4,510,691 | 4/1985 | Meyer | 33/556 |
| 4,553,332 | 11/1985 | Golinelli et al. | 33/561 |
| 4,763,417 | 8/1988 | Ernst | 33/832 |

FOREIGN PATENT DOCUMENTS

| | | | |
|---|---|---|---|
| 849486 | 7/1952 | Fed. Rep. of Germany . | |
| 0217009 | 1/1985 | Fed. Rep. of Germany | 33/832 |
| 764870 | 1/1957 | United Kingdom . | |

Primary Examiner—William A. Cuchlinski, Jr.
Assistant Examiner—Christopher Fulton
Attorney, Agent, or Firm—Spencer & Frank

[57] ABSTRACT

A device for determining the position of a workpiece face comprising: a body having a longitudinal axis and a longitudinal bore concentric with the longitudinal axis; an extendable member having a first end movable within the bore along the axis, an arrangement on the member for moving the first end of the extendible member, a coupling member fastened to the first end of the extendable member for movement therewith, an arrangement for relesably securing a second end of the extendable member within the bore, a sensor head, a resilient member for attaching the sensor head to the coupling member, an essentially spherical contact tip attached to the sensor head and aligned with the axis for travel along an axial path in conjunction with the movement of the first end of the extendable member, and a deflecting arrangement for deflecting the tip out of alignment with the axis, the deflecting arrangement being attached to the body at a known angle with respect to the longitudinal axis and positioned in the path of the tip, whereby deflection of the tip causes at least one point on the surface of the tip to advance toward the workpiece surface along a path radial to the axis.

8 Claims, 1 Drawing Sheet

MEASURING DEVICE FOR DETERMINING THE POSITION OF WORKPIECE FACES

REFERENCE TO RELATED APPLICATIONS

This application claims the priority of Federal Republic of Germany application Ser. No. P 3808548.8 filed Mar. 15th, 1988, which is incorporated herein by reference.

BACKGROUND OF THE INVENTION

The present invention relates to measuring devices for determining the position of workpiece faces, particularly along edges, steps and/or similar surfaces of a workpiece. More specifically, the present invention relates to devices incorporating a mechanical sensor which contacts the face to measure its distance from a reference plane.

In most prior art mechanical contact measuring devices for checking the position of workpiece faces, an adjustable sensor head is extended along a longitudinal axis perpendicular to the workpiece face. The length of the extension necessary for the sensor head to contact the workpiece face is utilized to determine the location of the workpiece face. With these devices, only those workpiece faces which are oriented perpendicularly to the measurement pickup or, more precisely, to the longitudinal axis, can be measured.

If a plurality of such measuring devices are combined into a measuring system for checking, for example, a shaft having a plurality of sections of varying diameters, the faces appearing on such shafts, particularly at its edges, steps and recesses, are checked by a plurality of measurement pickups which can interfere with one another because of their different orientations. Thus, there is a limit to the number of simultaneous measurements possible.

To remedy this, the measurement pickups are often equipped with complicated auxiliary devices such as, for example, multiple headed sensor tips which are mounted on the individual measurement pickups. Alternatively the individual measurement pickups can be arranged in different measuring planes around the shaft to be measured. However, with both of these alternatives, the potential number of measuring locations which can be simultaneously covered is low, the expense of the equipment can be high, and the quantity of required adjustments can be very extensive. These disadvantages are increased if, for example, both the step and length measurements of a shaft are to be checked.

SUMMARY OF THE INVENTION

It is therefore an object of the present invention to provide a measuring device for determining the position of workpiece faces, particularly at edges, steps, recesses and the like, which is distinguished by low costs and which permits the realization of a high measuring location density, particularly for checking partial and overall lengths of workpieces in conjunction with known measurement pickups in essentially the same orientation as these pickups.

This is accomplished according to the present invention by a measuring device for determining the position of a workpiece face comprising a body having a longitudinal axis and a longitudinal bore concentric with said longitudinal axis; an extendable member having a first end movable within the bore along the axis, means disposed on the member for moving the first end of the extendable member, a coupling member fastened to the first end of the extendable member for movement therewith, means for releasably securing a second end of the extendable member within the bore, a sensor head, resilient means for attaching the sensor head to the coupling member, an essentially spherical contact tip attached to the sensor head and aligned with the axis for travel along an axial path in conjunction with the movement of the first end of the extendable member, and deflection means for deflecting the tip out of alignment with the axis, the deflection means being attached to the body at a known angle with respect to the longitudinal axis and positioned in the path of tip, whereby deflection of the tip causes at least one point on the surface of the tip to advance toward the workpiece surface along a path radial to the axis.

One particular advantage of the measuring device according to the present invention is that the extendable longitudinal shaft, including the length measurement device, can be arranged parallel to the workpiece face to be checked. Since the device is provided with a sensor head which has a spherical or ball point sensor tip which can contact the face at a right angle to the shaft axis, the extendable sensor axis does not need to be perpendicular to the measured face. The sensor tip is deflected out of the line of the extension axis and into contact with the workpiece face. The tip is resiliently supported by way of a leaf spring extending parallel to the workpiece face to be checked. An advancing movement of the sensor head and the ball point tip is correspondingly translated, by way of a deflecting member provided in the measuring device according to the invention, into a movement oriented radially to the longitudinal extension axis of the measuring device, such movement resulting in a point on the surface of the spherical ball tip being placed against the workpiece face to be checked.

Since the dimensions of the measuring device according to the invention can be kept very small, it is possible in an advantageous manner, for example when measuring a shaft having multiple steps, to measure a plurality of step lengths simultaneously. This is even possible independently of the orientation of the steps since the body of the measuring device according to the invention can be configured and oriented in such a manner that, as the sensor head is moved forward, the correspondingly sloped deflecting face urges the ball tip toward the left or right as desired and thus a face to be checked that is disposed to the left or right of the length measurement pickup can be scanned.

A further advantage of the measuring device according to the present invention is that it can be provided with an exchangeable accessory device, for example for checking recessed grooves for securing rings and the like, with this device being provided with a tracer pin which moves at a right angle to the longitudinal axis of the measuring device and is pressed onto the face to be checked by the ball point tip of the measurement pickup.

One advantageous configuration for the measuring device according to the invention utilizes a length measurement pickup with an integral extension adjustment device. The sensor piston can be extended, for example, pneumatically and can be reset by way of spring forces. Alternatively, double action sensor pistons or pistons reset by means of vacuum pressure are also possible for use in a measuring device according to the present invention.

BRIEF DESCRIPTION OF THE DRAWINGS

The invention will now be explained and described in greater detail with reference to the following figures.

DETAILED DESCRIPTION OF THE PREFERRED EMBODIMENTS

Figure 1:
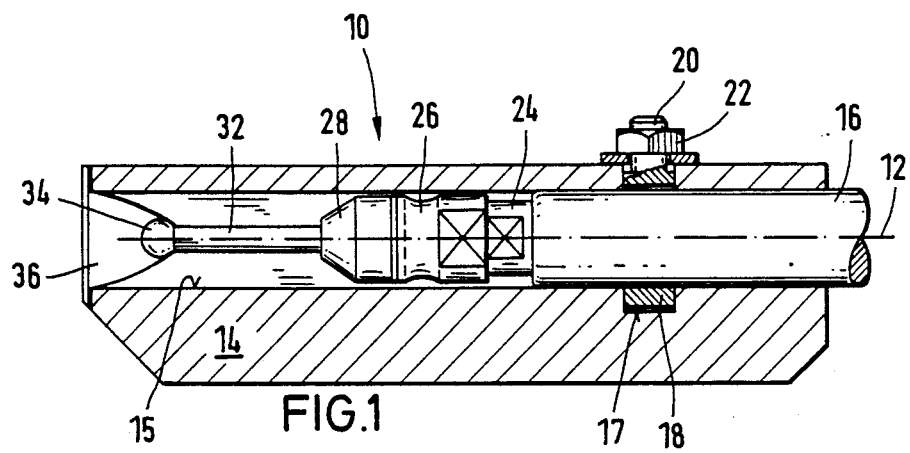
FIG. 1 is a partial sectional side view of a measuring device according to the invention with the extension cylinder in the retracted position.
Figure 2:
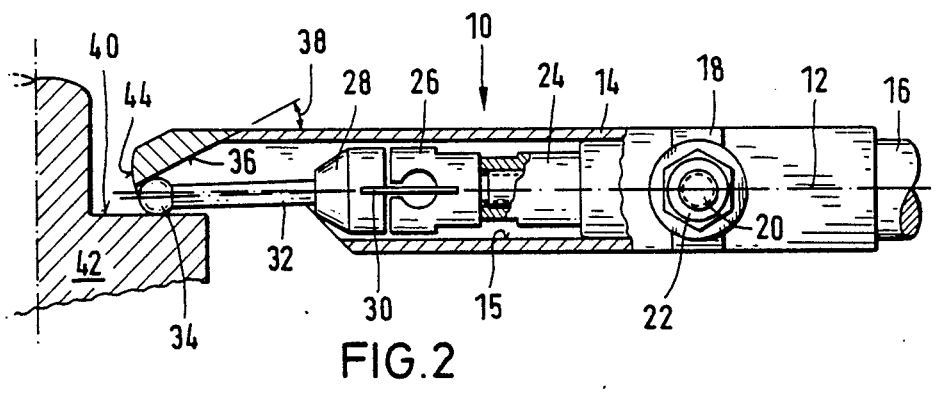
FIG. 2 is a partial sectional top view of a measuring device according to FIG. 1 in the measuring position, with the extension cylinder extended.

FIGS. 1 and 2 illustrate a measuring device 10 which includes a body 14 having a longitudinal axis 12. Longitudinal axis 12 is the center line of a longitudinal bore 15 provided in body 14 in which a length measurement device 16 is releasably fastened.

In the region of length measurement device 16, body 14 is provided with a slot-shaped recess 17 into which a tightening member 18 is inserted which surrounds length measurement device 16 in such a manner that the device is clamped into body 14 when a nut 22 is tightened on a threaded bolt 20 connected with tightening member 18 in body 14. In this manner the position of device 16 within the body 14 is secured.

Sensor piston 24, illustrated in its retracted position in FIG. 1, of length measurement device 16 is actuatable by a suitable pressure medium, preferably pneumatically or hydraulically, and is movable longitudinally along longitudinal axis 12. A coupling member 26 is attached to sensor piston 24, preferably screwed into it. Coupling member 26 is connected with a sensor head 28 by means of a leaf spring 30, FIG. 2, with the plane of this leaf spring 30 being oriented in the direction of longitudinal axis 12 and, during the actual measuring process, parallel to a face 40 on a first workpiece 42 to be checked. FIG. 2 illustrates that leaf spring 30 permits a slight deflection of sensor head 28 relative to coupling member 26 with respect to longitudinal axis 12.

A rod 32 equipped with a spherical ball point tip 34 is attached to sensor head 28. By actuating the length measurement device 16, for example by charging sensor piston 24 with compressed air, sensor head 28 and thus ball point tip 34 are displaced along longitudinal axis 12 from the position illustrated in FIG. 1 toward the position illustrated in FIG. 2, in the direction toward deflecting face 36 provided in the front portion of body 14. After ball tip 34 has contacted deflecting face 36, further advancement will deflect ball tip 34 out of axial line 12 toward workpiece surface 40. The movement of ball tip as a whole will be an arc, however, at all times a point on the surface of the ball will travel toward surface 40 along a radius from axial line 12. This point will change as the ball tip 34 advances through its arc, and will correspond to the point on the surface of the ball which finally contacts surface 40 as the ball rests against the workpiece as illustrated in FIG. 2.

Deflecting face 36 which projects into the interior of body 14 is disposed at an angle with respect to the longitudinal axis 12 of device 10 and forms an angle 38 with longitudinal axis 12. Angle 38, in the exemplary embodiment, is preferably 26° 33' 54" since the tangent of such an angle equals 0.5; however a wide range of angles can be utilized. For example, a radial deflection of ball point tip 34 relative to longitudinal axis 12 of 1 μm corresponds to a change in the measuring path length of measurement device 16 and of sensor piston 24 of 2 μm when an angle of 26° 33' 54" is employed.

During the measuring process, deflecting face 36 together with workpiece face 40 form a sort of wedge-shaped recess into which the ball point tip 34 on rod 32 of sensor head 28 is urged, until it comes into contact with the workpiece and is restrained from further advance by the workface 40 and the deflecting face 36 on both sides.

Once the ball tip 34 has reached the end of its travel, the length of extension of sensor piston 24 is determined by sensor means within length measurement device 16 which determines the amount of travel of piston 24. The deflection of ball tip 34 is also factored into the final measurement dependant upon angle 38 in determining the location of face 40. Therefore, for an angle 38 of 26° 33' 54", if ball tip 34 has to travel 2 μm after contacting deflection surface 36 before reaching the end of its travel, surface 40 lies 1 μm plus the radius of ball tip 34 from centerline 12.

Body 14 has a frontal end face 44 oriented toward first workpiece 42 and serving as a supporting or prism arm face, preferably of a spherical nature so that, if necessary, the first workpiece 42 to be checked can be supported or mounted on it.

Figure 3:
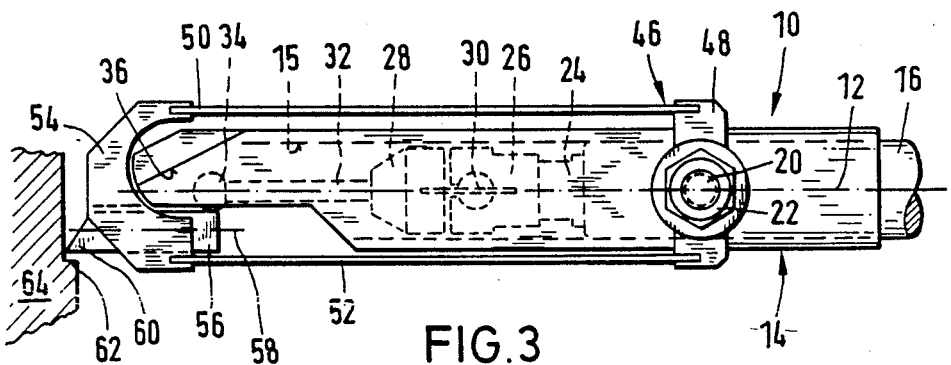
FIG. 3 is a plan top view of a measuring device according to FIG. 2 equipped with an accessory device for scanning by means of a tracer pin.

The measuring device 10 illustrated in FIG. 3 is provided with an accessory device 46 which makes it possible to check extremely narrow workpiece faces. This accessory device 46 comprises a substitute tightening member 48, a first leaf spring arm 50 and a second leaf spring arm 52 as well as a yoke 54 and a tracer pin 56 fastened therein.

If accessory device 46 is employed, substitute tightening member 48 is exchanged for tightening member 18 shown in FIGS. 1 and 2 Nut 22 tightened on threaded bolt 20, also serves to fasten the length measurement device 16 in body 14 of measuring device 10, as well as to secure the accessory 46.

First leaf spring arm 50 and second leaf spring arm 52 are each fixed at their ends to substitute tightening piece 48 and yoke 54, respectively, with leaf spring arms 50 and 52 being disposed parallel to leaf spring 30 and thus, in use, parallel to a face 62 to be checked on a second workpiece 64. The two leaf spring arms 50, 52 form a parallelogram with substitute tightening member 48 and yoke 54.

Tracer pin 56 is fixed within yoke 54 with its sensing edge 60 extending forward of the yoke 54 and oriented toward the workpiece face 62 to be checked, and its longitudinal axis 58, extending parallel to longitudinal axis 12. Prior to measurement, with the ball tip 34 in the retracted position, as illustrated in FIG. 3, the ball tip 34 remains in contact with the upper surface of the tracer pin 56.

For measuring, sensor piston 24 of length measurement device 16 is moved forward by means of a suitable pressure medium so that ball point tip 34 on rod 32 of sensor head 28 is pressed against deflection face 36. This process corresponds to the process described above. Ball point tip 34 presses against deflection face 36 and simultaneously deflects tracer pin 56 attached in yoke 54, which, in order to realize a precisely defined contact zone, is flattened on its upper surface facing and contacted by ball point tip 34. Ball point tip 34, which acts on tracer pin 56, slightly deflects yoke 54 so that the sensing edge 60 of tracer pin 56 is brought against the workpiece face 62 to be checked. Due to the parallelogram shape of accessory device 46, the longitudinal axis 58 of tracer pin 56 remains parallel with the longitudinal axis 12 of device 10 as sensing edge 60 lies against the face 62 to be checked.

In both illustrated embodiments, after the measurement is sensed, and pressure has been relieved, sensor piston 24 is returned to its starting or retracted position by a suitable measure, for example by vacuum pressure or by spring force.

The particular advantage of measuring device 10 according to the invention can be seen in that ball point tip 34 is subjected exclusively to point-type stresses at deflecting face 36 and at workpiece face 40 which is to be checked, as well as at tracer pin 56 so that the required high measuring accuracy is not interfered with.

Moreover, the frontal face 44 of basic element 14 which, according to the invention, is designed as a supporting or prism arm face can be employed in an advantageous manner if the length of a stepped shaft section is to be measured and the shaft itself can be or is to be held or supported on its stepped-down section. Two measuring devices according to the invention can then be arranged in a simple manner in such a way that their frontal end faces form a prism on which the shaft to be checked is positioned accurately. Currently filed copending United States application, claiming priority of Federal Republic of Germany application number P 38 08 551.8 filed on Mar. 15, 1988, of the same inventor as the present invention, teaches a configuration for supporting a shaft in this manner.

The foregoing description of exemplary embodiments is for illustrative purposes, and is not to be read as limiting the scope of the present invention. Further embodiments of the present invention will be apparent to the skilled artisan given the forgoing description. These are to be considered within the scope of the present invention, which is defined by the following claims.

What is claimed is:

1. A device for determining the position of a workpiece face comprising:
   a body having a longitudinal axis and a longitudinal bore concentric with said longitudinal axis;
   an extendable member having a first end movable within said bore along said axis,
   means disposed on said member for moving said first end of said extendable member,
   a coupling member fastened to said first end of said extendable member for movement therewith,
   means for releasably securing a second end of said extendable member within said bore,
   a sensor head,
   resilient means for attaching said sensor head to said coupling member,
   an essentially spherical contact tip attached to said sensor head and aligned with said axis for travel along an axial path in conjunction with the movement of said first end of said extendable member, and
   deflection means for deflecting said tip out of alignment with said axis, said deflection means being attached to said body at a known angle with respect to said longitudinal axis and positioned in said path of said tip, whereby
   deflection of said tip causes at least one point on the surface of said tip to advance toward said workpiece surface along a path radial to said axis.

2. The device of claim 1, wherein said resilient means includes a planer leaf spring disposed in a plane containing said axis.

3. The device of claim 2, wherein said deflection means includes a planer surface oriented at a known angle with respect to the plane of said leaf spring, and oriented essentially parallel to a line perpendicular to said travel path of said tip and lying within said leaf spring plane.

4. The device of claim 1, wherein said body includes a frontal face oriented toward said workpiece for supporting said workpiece.

5. The device of claim 2, further comprising:
   a yoke mounted on said body adjacent said deflection means for movement in the direction of the deflection of said tip by said deflection means;
   second and third planar leaf springs oriented parallel to the plane of said first leaf spring and disposed on opposite sides of said body, each of said leaf springs having one edge attached to said yoke and its opposite edge attached to said body.

6. The device of claim 5, wherein said opposite edge of each of said second and third leaf springs is attached to said body via said means for realeasably securing a second end of said extendable member.

7. The device of claim 5, wherein said second and third leaf springs are mounted facing opposite planer sides of said first leaf spring, whereby said yoke and said second and third leaf springs in combination form three sides of a parallelogram surrounding said first leaf spring.

8. The device of claim 7, further comprising:
   a tracer pin fixedly attached to said yoke for movement therewith and having a longitudinal axis oriented parallel to the plane of said first leaf spring,
   said tracer pin having a sensor edge which extends past a frontal face of said yoke in said longitudinal direction and a longitudinally extending edge which is in contact with said tip, whereby
   said tracer pin is moved radially with respect to said axis toward and into contact with a workpiece face as a result of said defection of said tip, while maintaining said parallel orientation.

* * * * *